May 8, 1951     W. H. BENDALL     2,551,578
FLEXIBLE LINK CHAIN

Filed May 30, 1945     3 Sheets-Sheet 1

INVENTOR.
Wilfrid H. Bendall
BY E. W. Marshall

May 8, 1951 W. H. BENDALL 2,551,578
FLEXIBLE LINK CHAIN
Filed May 30, 1945 3 Sheets-Sheet 2

Wilfrid H. Bendall
INVENTOR.

BY E. W. Marshall

May 8, 1951 W. H. BENDALL 2,551,578
FLEXIBLE LINK CHAIN
Filed May 30, 1945 3 Sheets-Sheet 3

Wilfrid H. Bendall INVENTOR.
BY E. W. Marshall

Patented May 8, 1951

2,551,578

UNITED STATES PATENT OFFICE 2,551,578

FLEXIBLE LINK CHAIN

Wilfrid H. Bendall, New York, N. Y.

Application May 30, 1945, Serial No. 596,672

17 Claims. (Cl. 74—229)

This invention relates to an improved flexible link chain for general power transmission purposes.

Link chains widely employed for this purpose at the present time differ fundamentally from the chain of the present invention in utilizing rigid, pin-jointed link members. As is well known, the pitch-line of a rigid link chain on its drive sprocket is polygonal rather than circular and its engagement action is inherently one of impact with the teeth of the drive sprockets. Such impact is proportional to the square of the speed of operation and thus may rapidly assume destructive intensity. A further disadvantage is a pronounced fluctuation in the angular velocity ratio of the drive, particularly with smaller sprockets, owing to the polygonal pitch-line thereon. Consequently, while the usual manufacturing refinements impart high potential power transmitting capacity to such chains, these inherent operating peculiarities act to drastically limit and even prevent effective utilization of this capacity.

It is recognized that the prior art shows numerous examples of chain constructions using articulated links composed of apertured, interlocked stampings of sheet materials. The links of these earlier proposals, again, are invariably rigid and thus work with the defects noted above. None of them appears to have recognized the practical possibility of achieving smooth, substantially frictionless, operation and eliminating destructive impact by using functionally flexible links. The present invention does this, and thus embodies a fundamental improvement over the prior art.

A primary object of this invention, therefore, is to provide a power transmission chain and cooperating drive wheels of economical design and construction, combining the smooth running characteristics and simple installation features of belt drives with the positive drive feature of chains.

Another object is to provide a power transmission chain capable of transmitting power at a substantially constant angular velocity ratio with any desired arrangement of the drive wheels.

Another object is to provide a power transmission chain in which chain impact and friction are substantially reduced.

Another object is to provide a power transmission chain in which all link pitch sizes operate with equal efficiency and smoothness, over a wide range of speeds, so that only a limited number of pitch sizes is required.

Another object is to provide a flexible link chain usable with reverse flexure so that both faces of the chain can be used simultaneously to transmit opposed rotation to one or more of a plurality of drive wheels.

A further object is to provide a flexible link chain adaptable through minor link modifications for efficient driving engagement with both toothed wheels and grooved friction wheels, separately or simultaneously, and with opposed conical friction wheels in which speed variation is effected by changing the axial spacing of the cones to vary the effective drive diameter.

Another object is to provide a flexible link chain comprising links with integral interconnecting means, so that comp'ete chains can be assembled from a single type of link.

Another object is to provide flexible chain links constructed of a variable number of laminae that can be stacked and interlocked to vary the power transmitting capacity of the chain.

The foregoing objects are attained in part by employing some of the flexible link principles and constructional ideas described in a related United States patent, No. 2 062,115, issued to me November 24, 1936, of which the present invention is a further development and improvement. Other objects and advantages in addition to those stated above will be apparent from the following description and accompanying drawings, in which several embodiments of the invention are described, the novel features of which will be defined in claims.

Referring to the drawings.

Figure 1:
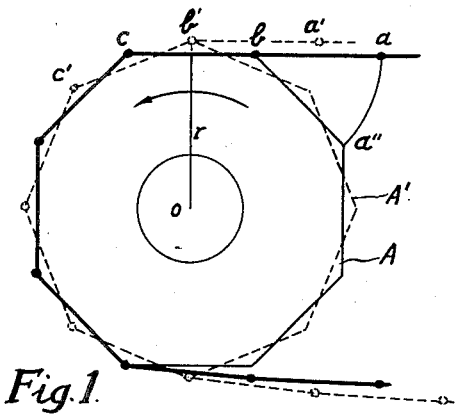
Figure 1 is a diagram illustrating the operating characteristics of rigid link chains.

Fig. 1 illustrates the basic causes of link impact, joint wear, and fluctuation in the effective drive radius with rigid link chains of the well known roller and toothed link types. An eight tooth sprocket designated by A is represented diagrammatically as rotating about the center point $o$ in the direction of the arrow and driving a chain composed of pivotally connected rigid links. Pivotal centers of two of the links are designated by $a$, $b$ and $c$, the distance between adjacent pivot centers being the pitch length of the link. The link between centers $a$ and $b$ is about to engage the sprocket and the link between centers $b$ and $c$ is in full engagement therewith. Lines drawn through successive pivot centers of the chain links which are on the sprocket obviously constitute the effective pitch-line of the latter and lie in a polygon.

With a polygonal pitch-line the drive radius is not constant in value and therefore cannot transmit constant linear speed to the chain. The instantaneous effective drive radius is indicated by the radial line $r$ extending from drive center $o$ to the line of chain pull extending through the pivot centers $a$, $b$ and $c$. This is the minimum value of the effective drive radius. The position of the drive sprocket and chain following rotation in the direction of the arrow equal to one-half the pitch is indicated by the broken outline A', and the resulting pivotal positions of the two links under consideration are designated $a'$, $b'$ and $c'$. In reaching this position the drive strand of the chain has been bodily displaced and the effective drive radius is now equal to the distance from $o$ to a line passing through pivotal centers $a'$ and $b'$. This is the maximum value of the effective drive radius. Further rotation in the same direction, equivalent to an additional half pitch, restores the drive radius and the sprocket and chain to their initial positions, with the exception that the sprocket and chain have now advanced one pitch. The effective drive radius thus fluctuates in value twice as each link engages the sprocket. The links must also swing through an angular distance designated by the arcuate line from pivot center $a$ to $a''$ on the sprocket, as they approach and leave the latter. Engagement takes place with a definite impact owing to the different relative velocities of points $a$ and $a''$.

The operating conditions thus outlined are inherent in all rigid link chain drives and are the basic cause of the performance limitations enumerated earlier.

Figure 2:
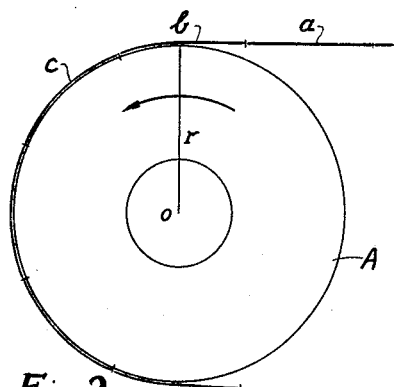
Fig. 2 is a similar diagram illustrating the operating characteristics of my novel flexible link chains.

The diagram in Fig. 2 illustrates the operating characteristics of flexible link chain. The simple character of the diagram, by contrast with that of Fig. 1, is indicative of the greatly improved operating conditions using flexible links. In this case the drive wheel A has a rim of constant diameter. With uniformly flexible links assembled end to end, three of which are designated $a$, $b$ and $c$, the pitch-line of the chain on the wheel conforms closely to the rim curvature and the effective drive radius $r$ has a constant value. The drive wheel thus imparts constant linear velocity to the chain. The chain action is purely flexural and closely approximates that of a belt, and since the links engage the wheel at zero relative velocity there is no impact and no pivotal action involving friction.

Figure 3:
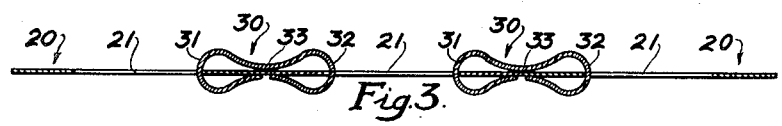
Fig. 3 is a sectional side elevation of a simple structure which embodies the present invention.
Figure 4:
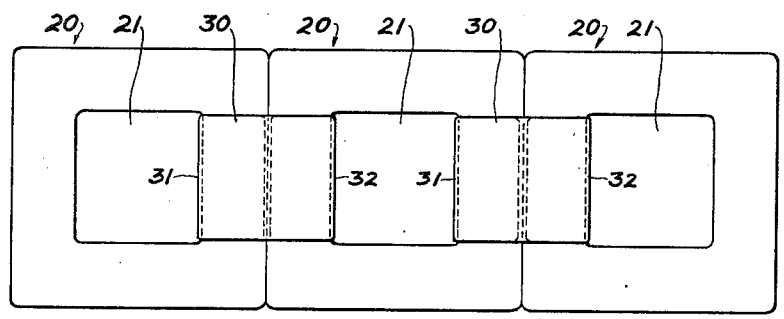
Fig. 4 is a plan view of the parts shown in Fig. 3.

Figs. 3 and 4 show a part of a simple chain structure which embodies this invention comprising apertured flexible links 20 interconnected by curved flexible links 30. The links 20 are rectangular plates having apertures 21 therein. These apertures preferably are made square so as to give the advantage of two sets of bearing edges and to facilitate manufacturing assembly. The links 20 are assembled end to end. The curved links 30 have spaced semi-circular end portions 31, 32 which pass through the apertures 21 in adjacent links 20 and an intermediate curved portion 33 which bears upon the adjacent ends of links 20.

Figure 5:
Fig. 5 is a sectional side elevation of a chain similar to that shown in Figs. 3 and 4 in which the links are composed of a plurality of layers.
Figure 6:
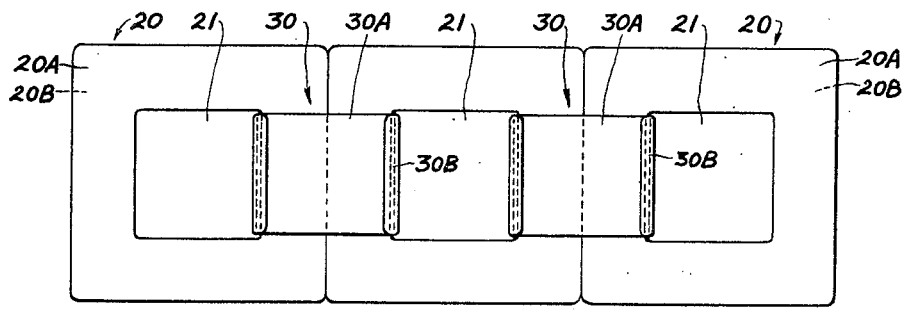
Fig. 6 is a plan view of the parts shown in Fig. 5.

The chain construction in Figs. 5 and 6 shows curved flexible links 30 comprising, in this case, a plurality of interchangeable link members designated 30A and 30B. Apertured links 20 are similarly composed of a plurality of rectangular plate members designated 20A and 20B. The curved interconnecting links 30 may be assembled together on one side of the apertured links 20 but preferably are opposed as shown. The ends interlock to form a closed link, passing through and engaging the bearing edges of the apertures 21 in links 20, and hold the ends of the latter in substantially abutting relationship. The curves in the interconnecting links 30 also serve to add a desirable degree of extensibility to the chain structure, giving effective resistance to shock loading and misalignment.

Figures 7, 8:
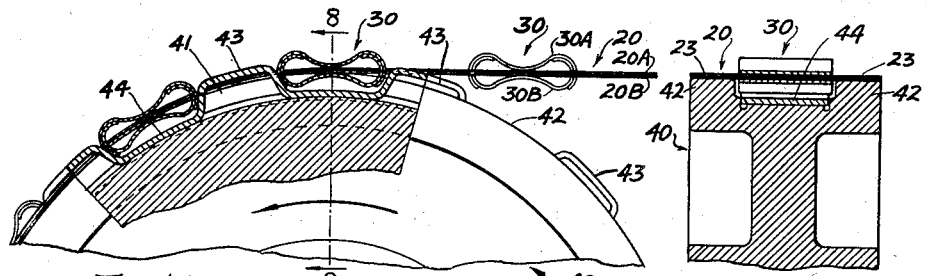
Fig. 7 is a partially sectioned side elevation on a smaller scale of the chain shown in Figs. 5 and 6 and a part of a drive wheel.
Fig. 8 is a sectional end elevation of the parts shown in Fig. 7, the section being taken on the line 8—8 of the latter figure.

Figs. 7 and 8 show the chain engaging a drive sprocket 40 with a central annular channel 41 and continuous rim sections 42, 42 of larger radius, on each side thereof. Sprocket teeth 43 for engaging the chain are formed by a transversely corrugated strip 44 brazed or spot-welded to the rim channel 41, as shown in the sectioned detail of Figs. 7 and 8. The outer portions 23 of links 20, at each side of the interconnecting links 30, lie on the sprocket rim sections 42, 42 during engagement and the chain is thus fully controlled in its approach to the sprocket, moving in the same direction and at the same speed as the rim. Under these conditions the interconnecting links 30 engage the sprocket teeth without impact, and since the action of the links is almost purely flexural the transmission is substantially frictionless.

Since the curves in links 30 result in proportionately increased flexibility these links are preferably made of slightly heavier material, which increases their capacity without lessening their flexibility relative to the flat links.

The drive sprocket detail in Figs. 7 and 8 shows a desirable construction of such parts. Ordinarily the production of chain sprockets requires a series of specially formed cutters for a given range of sprocket tooth numbers of each pitch dimension. The method presented here utilizes sprocket teeth separately formed in a continuous strip and attached to the sprocket rim after cutting to length and bending to the approximate rim curvature. Only one size of sprocket tooth strip formed in this manner is required for the full range of tooth numbers of a given pitch. In this way the sprocket teeth, which take the load, can be formed from high strength material, while the hub and rim section can be separately produced by a simple turning operation, or by stamping or spinning operations, in any suitable material of moderate structural strength.

Figures 9, 10:
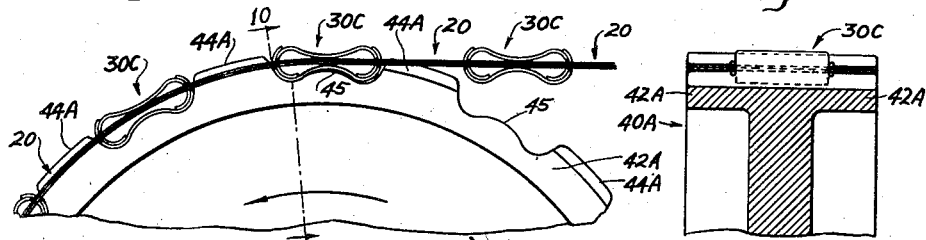
Fig. 9 is a side elevation of a flexible link chain and drive wheel of modified construction.
Fig. 10 is a section of the parts shown in Fig. 9, the section being taken on the line 10—10 of the latter figure.
Figures 11, 12:
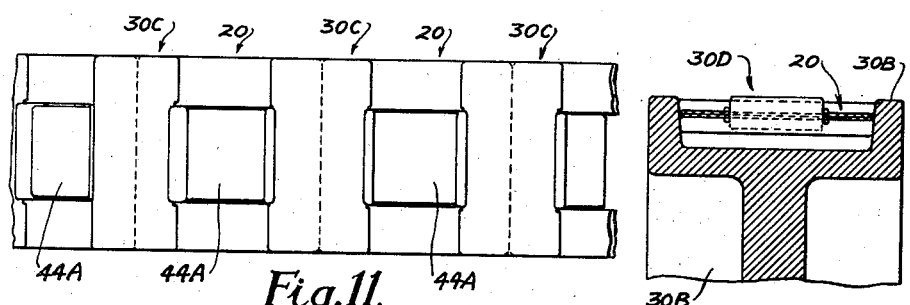
Fig. 11 is a plan view of the chain and wheel shown in Fig. 9.
Fig. 12 is a view showing a chain similar to that shown in Figs. 9, 10 and 11 modified to adapt it for frictional engagement with a grooved pulley.

Figs. 9, 10 and 11 show a chain with modified interconnecting links 30C engaging a drive sprocket 40A. This modification consists in extending the parts of the links 30C which do not pass through the apertures in the plates 20 out to the full width of the chain, giving an interconnecting link of comparatively greater capacity. The sprocket rim 42A has engagement recesses 45, corresponding to the profile of the links 30C, cut transversely the full width of the rim. The links thus have the required continuous bearing at the rim and the chain pitch-line is maintained at a constant drive radius, meeting the basic requirement for shockless engagement and constant angular velocity driving. The integral sprocket tooth projections 44A extend through the apertures in links 20 and retain the chain against lateral creep on the sprocket rim.

A further modification of the interconnecting link members 30C of the chain shown in Figs. 9, 10 and 11 permits a chain with links of this type to be used with grooved friction wheels. Fig. 12 shows a cross-section of the chain with a modified link 30D engaging a pulley 30B having a groove with tapered sides. The extended sides of the links are shaped to a corresponding taper for frictional engagement with the sides of the pulley groove. It will be evident that the transverse curves in the interconnecting links enable them to withstand considerable lateral or edgewise pressure for this purpose, and that modifying the links in this way does not prevent use of the chain for simultaneous positive engagement with drive sprockets of the type shown in Figs. 7 to 10. Where it is desired to use the chain exclusively for friction driving it is preferable to pitch the interconnecting links 30D as closely as possible, employing flat links 20 with apertures having a shorter dimension in the line of the drive strand.

Figure 13:
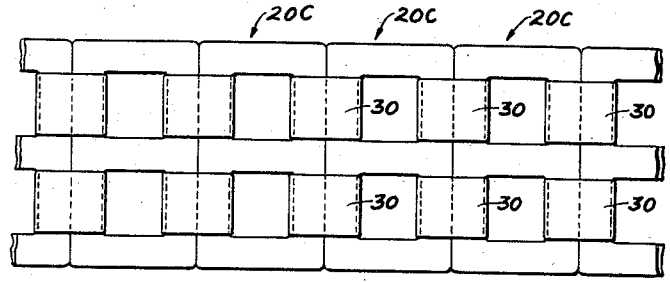
Fig. 13 is a plan view on a smaller scale of another modification, a double unit width flexible link chain.

All of the flexible link chains described in the foregoing are single unit width chains but it will be obvious that multiple unit width chains can be produced by duplicating the basic link arrangement in parallel. Fig. 13 shows a multiple width unit construction using links 20C having either a plurality of layers or a single layer with transversely spaced apertures interconnected by curved interconnecting links 30, which are interchangeable with those used for the single width chain in Figs. 5 to 8. These interconnecting links may alternatively be of the multiple width unit type, extending across the full chain width as for the single width chain in Figs. 9 and 10 and engaging drive sprockets of the required over-all width having a plurality of rows of transversely spaced teeth to co-operate with the transversely spaced apertures of the links 20C.

Figure 14:
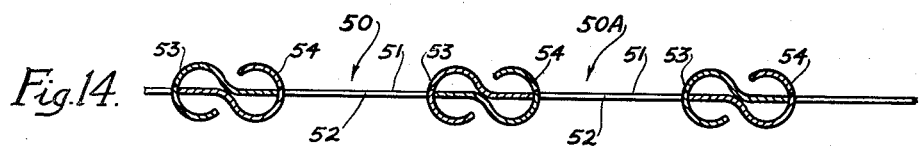
Fig. 14 is a sectional side elevation of another construction which also embodies this invention.
Figure 15:
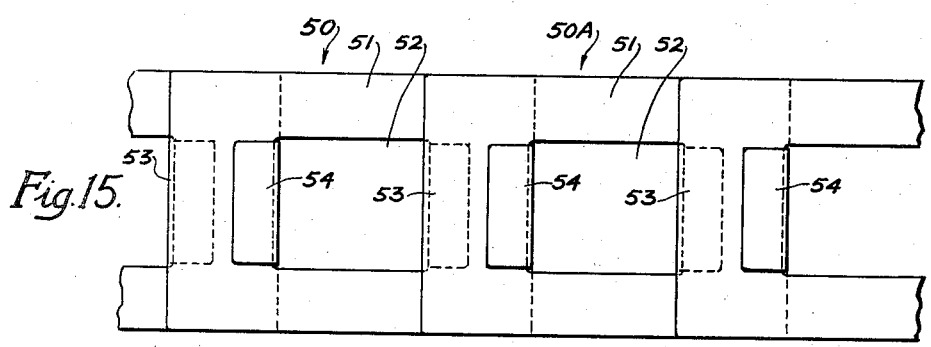
Fig. 15 is a plan view of the parts shown in Fig. 14.
Figure 16:
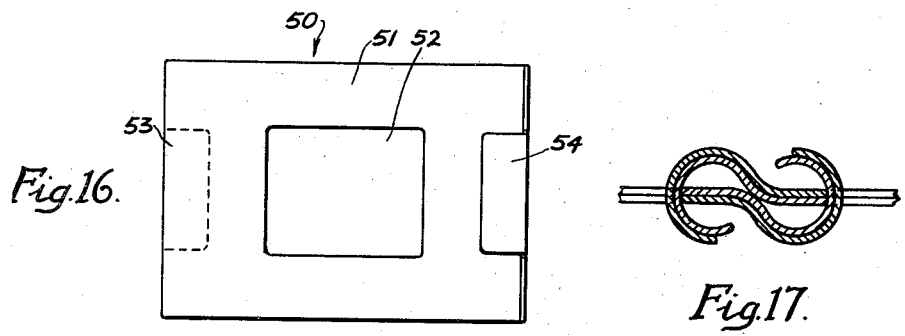
Fig. 16 is a plan view of one of the links shown in Figs. 14 and 15.

It will be noted that the flexible link chain constructions thus far described are characterized by the use of two distinct forms of flexible link members. A construction having a single link member combining the functions of the above link forms is shown in Figs. 14, 15 and 16. Each of the links 50, 50A has a flat portion 51 with a rectangular aperture 52 therein and transversely curved end portions 53, 54. Each curved portion, where it departs from the flat portion, is in transverse supporting contact with a similarly curved portion of an adjacent link, while the continuation of each curved portion is reduced in width to permit it to pass through and engage the transverse edge of the aperture of the adjacent link. As shown the reduced width curved portion 53 of link 50A passes through the aperture 52 in link 50 and engages a transverse edge thereof, while the similarly reduced portion 54 of link 50 passes through the aperture of link 50A to engage a transverse edge of the latter. It will be seen that with this link construction each end of a link overlaps and engages an identically shaped end of an adjacent link at a plurality of longitudinally spaced transverse lines. Thus, the left hand end of link 50A, after first engaging a curved end portion 54 of adjacent link 50 with an edge of its own aperture, continues over the curved end portion and passes through the aperture of link 50 to engage a transverse edge thereof. The resulting transverse lines of engagement are thus seen to be separated by the distance between adjacent transverse edges of the overlapping links. A further transverse line of engagement results from the tangential bearing contact of the links at the median point of the overlap.

An important advantage of this novel method of interconnection is that the load transmitting capacity of the connection is doubled by the resulting engagement of each link end at the transverse edges of the apertures of both members. A further advantage is that the links are prevented from pivoting by the longitudinally separated lines of engagement and are thus held in continuous flexural alignment with each other.

As shown in the drawings the curved ends of the links described immediately above are preferably formed in opposite directions and thus are open on opposite sides of each link. This feature is to permit a chain assembled from such links to have either an odd or an even number of links— a structural convenience not readily achieved with ordinary chain constructions, which usually require a special offset connecting link for odd numbered link assemblies.

Figure 17:
Fig. 17 is a sectional side elevation on a larger scale of parts of a chain similar to that shown in Figs. 14–16 modified by being constructed of a plurality of layers.

This form of link may have multiple layers as shown in Fig. 17 and be constructed as a multiple unit width link while the side edges can be bevelled for wedging engagement with a grooved pulley, as shown for the chain in Fig. 12, in addition to operation on sprockets of the type shown in Figs. 9 and 10. In this latter case the chain bearing on the sprocket at the tooth spaces will not be quite continuous owing to the gap between adjacent link loops, 53, 54 Fig. 14, but flexural continuity is maintained by the method of interconnection described above.

Chain assembly in various lengths is readily accomplished without special tools by utilizing the prescribed link shapes and inherent spring qualities of suitable structural materials to automatically interlock, locate and retain the assembled links. Where the feature of separable interconnecting links is not required increased capacity may evidently be had by welding or bonding the interlocking curved sections of the interconnecting links after assembly, using any suitable process.

In addition to its other advantages, compared with rigid link pin-jointed chains, this flexible link chain presents the important economic advantage of production in larger and fewer pitch sizes for a given range of horsepower capacities, since all pitches run with equal smoothness and quietness. The improved operational characteristics of the flexible link and the greatly simplified construction result in a considerably lighter chain structure, making more efficient and economical use of a given bulk and weight of material for power transmission purposes.

It will be understood that a number of structural modifications of the chain and sprockets other than those described in the foregoing specification may be made within the spirit and scope of this invention. I do not limit myself to the specific constructions shown and described and in fact intend no limitations other than those imposed by the appended claims.

I claim:

1. A chain adapted for uniform flexure throughout its length comprising links of flexible sheet material each of said links being constructed with a rectangular aperture, and interconnecting links of like material having transversely curved end portions passing through the apertures in adjacent links and engaging transverse edges of said apertures and holding said links in flexural alignment with each other.

2. A chain adapted for uniform flexure throughout its length comprising links of flexible sheet material each of said links being constructed with a square aperture presenting four alternatively usable bearing edges and non-pivoting interconnecting links of like material having transversely curved end portions passing through the apertures in adjacent links and engaging said bearing edges of said apertures and holding said links in flexural alignment with each other.

3. A chain adapted for uniform flexure throughout its length comprising links of flexible sheet material, each of said links being constructed with a rectangular aperture, and interconnecting links of like material having transversely curved end portions passing through the apertures in adjacent links and engaging transverse edges of said apertures, the outer edges of said apertured links projecting laterally beyond the curved links for continuous bearing on a cylindrical drive wheel rim and holding said links in flexural alignment with each other.

4. A chain adapted for uniform flexure throughout its length comprising links of flexible sheet material disposed end to end, each of said links being constructed with a rectangular aperture, and a plurality of interconnecting links of like material having transversely curved end portions passing through the apertures in adjacent links and engaging transverse edges of said apertures, said interconnecting links having intermediate curved portions engaging the adjacent ends of the apertured links and holding said ends in flexural alignment with each other.

5. A chain adapted for uniform flexure throughout its length comprising links of flexible sheet material disposed end to end, each of said links being constructed with a rectangular aperture, and a plurality of interconnecting links of like material having transversely curved end portions passing through the apertures in adjacent links and engaging transverse edges of said apertures and having intermediate curved portions engaging the adjacent ends of the apertured links and holding said links in flexural alignment with each other, the outer edges of the interconnecting links being shaped for wedged frictional engagement with a grooved pulley.

6. A chain adapted for uniform flexure throughout its length comprising links of superimposed layers of flexible sheet material disposed end to end, each of said links being constructed with registering rectangular apertures, and a plurality of interconnecting links of like material having transversely curved end portions passing through the apertures in adjacent links and engaging transverse edges of said apertures and holding said links in flexural alignment with each other, said interconnecting links having intermediate curved portions bearing on the adjacent ends of the apertured links and maintaining uniform link curvature when said chain flexes to a given drive wheel diameter.

7. A chain adapted for uniform flexure throughout its length comprising links of superimposed layers of flexible sheet material disposed end to end, each of said links being constructed with registering rectangular apertures and a plurality of interconnecting links of superimposed layers of like material having transversely curved end portions passing through the apertures in adjacent links and engaging transverse edges of said apertures and holding said links in flexural alignment with each other, said interconnecting links having intermediate curved portions bearing on the adjacent ends of the apertured links and maintaining uniform link curvature when said chain flexes to a given drive wheel diameter.

8. A chain adapted for uniform flexure throughout its length comprising links of flexible sheet material each of said links being constructed with a rectangular aperture, and interconnecting links each comprising a plurality of superimposed layers of like material having transversely curved interlocking end portions in flexibly sprung locking engagement with each other passing through the apertures in adjacent links and holding said links in flexural alignment with each other.

9. Power transmission apparatus comprising a drive sprocket having cylindrical rims and an intermediate annular ring of sprocket teeth, a chain adapted for uniform flexure throughout its length comprising apertured links of flexible sheet material and interconnecting links of like material having intermediate curved portions engaging the adjacent ends of the apertured links and transversely curved end portions passing through the apertures in adjacent links and holding said links in flexural alignment with each other, said curved end portions being adapted to co-engage with said sprocket teeth and the parts of the apertured links outside of the interconnecting links being adapted to lie on the cylindrical rims of the sprocket to maintain a constant drive pitch diameter.

10. Power transmission apparatus comprising a drive sprocket having cylindrical rims and an intermediate annular ring of sprocket teeth and a grooved pulley, a chain adapted for uniform flexure throughout its length comprising apertured links of flexible sheet material and interconnecting links of like material having transversely curved end portions passing through the apertures in adjacent links and holding said links in flexural alignment with each other, said curved portions being adapted to co-engage with said sprocket teeth and the parts of the apertured links outside of the interconnecting links being adapted to lie in flexural conformity with the cylindrical rims of the sprocket, the outer edges of the interconnecting links being bevelled for wedged frictional engagement with the grooved pulley.

11. Power transmission apparatus comprising a drive sprocket having cylindrical rims and an intermediate annular ring of sprocket teeth, a chain adapted for uniform flexure throughout its length comprising apertured links of flexible sheet material having initially flat side portions and transversely curved end portions, said end portions passing through the apertures in adjacent links and holding said links in flexural alignment with each other and being adapted to co-engage with said sprocket teeth and said side portions being adapted to lie in flexural conformity with the cylindrical rims of said sprocket to maintain a constant drive pitch diameter.

12. Power transmission apparatus comprising a grooved pulley and a chain adapted for uniform flexure throughout its length comprising apertured links of flexible sheet material interconnected by a transversely curved end portion of a link passing through an aperture in an adjacent link and simultaneously engaging a transverse edge of the aperture and a transversely curved end portion of the adjacent link and holding said links in flexural alignment with each other, the outer edges of the links being bevelled for wedged frictional engagement with the grooved pulley.

13. Power transmission apparatus comprising a drive sprocket and a chain adapted for uniform flexural engagement therewith, said chain comprising apertured links of flexible sheet material, each of said links being provided with an identically shaped transversely curved portion at each end thereof, said links being interconnected and maintained in flexural alignment by overlapped bearing contact with each other at said curved portions and having said curved portions passing through each others apertures and simultaneously engaging transverse edges of said apertures, said curved portions being further adapted to engage the teeth of said drive sprocket.

14. A chain adapted for uniform flexure throughout its length comprising apertured links of flexible sheet material, each of said links being provided with an identically shaped transversely curved portion at each end thereof, said links being interconnected and maintained in flexural alignment by overlapped bearing contact with each other at said curved portions and having said curved portions passing through each others apertures and simultaneously engaging transverse edges of said apertures.

15. In the chain of claim 14, the construction of said links further comprising a plurality of layers of said flexible sheet material.

16. The chain of claim 14, the curved portion at one end of a link being formed in an opposite direction and open on an opposite side of said link with respect to the curved portion at the opposite end of the link.

17. A chain adapted for uniform flexure throughout its length comprising apertured links of flexible sheet material, each of said links being provided with an identically shaped transversely curved portion at each end thereof, each end of said links being interconnected and maintained in flexural alignment with an adjacent link at a plurality of longitudinally spaced transverse contact lines, said contact lines comprising a transverse bearing at a median part of a curved portion of a link overlapping and bearing on a curved portion of an adjacent link and a transverse bearing where each overlapping curved portion passes through and engages a transverse edge of a link aperture at each end of said overlapping portion.

WILFRID H. BENDALL.

REFERENCES CITED

The following references are of record in the file of this patent:

UNITED STATES PATENTS

| Number | Name | Date |
| --- | --- | --- |
| 307,011 | Caldwell | Oct. 21, 1884 |
| 452,122 | Kotter | May 12, 1891 |
| 465,612 | Vinson | Dec. 22, 1891 |
| 1,508,446 | Diehl | Sept. 16, 1924 |

FOREIGN PATENTS

| Number | Country | Date |
| --- | --- | --- |
| 55,704 | Germany | July 30, 1890 |